No. 703,652. Patented July 1, 1902.
W. U. GRIFFITHS.
EXPANSION BOLT.
(Application filed Feb. 17, 1902.)
(No Model.)
FIG. 1.
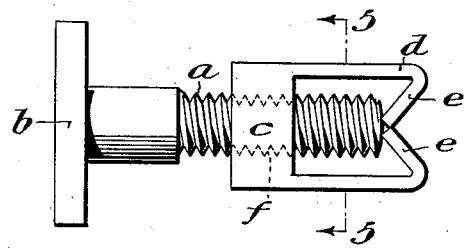
FIG. 2. FIG. 3.
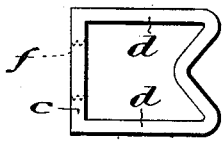 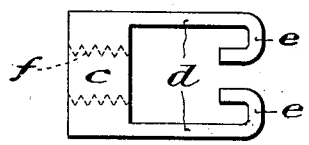
FIG. 4.
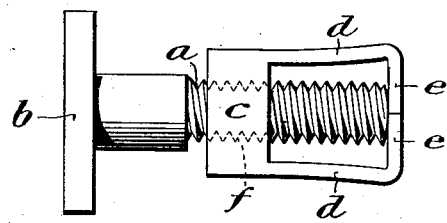
FIG. 5.
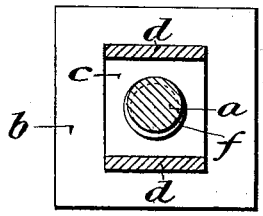
WITNESSES: INVENTOR:
William U Griffiths

UNITED STATES PATENT OFFICE.

WILLIAM U. GRIFFITHS, OF PHILADELPHIA, PENNSYLVANIA.

EXPANSION-BOLT.

SPECIFICATION forming part of Letters Patent No. 703,652, dated July 1, 1902.

Application filed February 17, 1902. Serial No. 94,437. (No model.)

*To all whom it may concern:*

Be it known that I, WILLIAM U. GRIFFITHS, a citizen of the United States, residing in the city and county of Philadelphia, in the State of Pennsylvania, have invented certain new and useful Improvements in Expansion-Bolts, of which the following is a specification.

My improvement relates to the class of devices adapted to be inserted within openings and expanded therein to secure them against withdrawal.

My invention aims to provide an expansion bolt, which, while adapted for the general uses to which such devices are put, is especially designed for employment in shallow openings formed in stone and marble, and, among other various uses, is particularly useful in clamping the basins to the tables of ordinary stationary washstands.
It is an especial object of my invention to provide an expansion bolt more simple and inexpensive in character, composed of fewer parts, and more efficient in operation, than such devices as heretofore constructed.
In the accompanying drawings, Figures 1 and 4 are views in side elevation of a good embodiment of my invention. In Figure 1, the parts are in the position they occupy prior to the expanding operation, and in Figure 4, in the position they occupy in the expanded condition of the structure.

Figures 2 and 3 are views in side elevation of slightly modified forms of the expansion member.
Figure 5 is a transverse section of the expansion member, section being supposed on the dotted line 5 5 of Figure 1.

Similar letters of reference indicate corresponding parts.
$a$ is a screw threaded member or bolt having a head $b$; said member may be, especially as to its outer end, of such proportions and conformation as the particular use to which it is put, may require.
$c$ is the head and $d$ the wings or arms of the expansion member. Said head $c$, in the embodiments illustrated, is formed with a tapped opening $f$ to which the threaded portion of the member $a$ is adapted, and the wings $c$ extend from said head forward, that is to say, in the direction followed by the longitudinally movable member $a$ in its forward travel.

The free ends of the wings are turned inwardly and rearwardly, as shown, to form what I term the bearing plates $e$, which plates, in the unexpanded condition of the parts, constitute an approximately V-shaped bearing or thrust receiving structure, which, in the advance of the longitudinally movable member, is encountered by the advance end of the latter.

The bearing plates $e$, in the embodiment of my invention illustrated in Figures 1 and 4, are so arranged that their inner ends abut against each other.

The operation of the device will be readily understood.

The member $a$, arranged within the opening $f$ of the expansion member, as I prefer to term the structure including the wings and bearing plates, is, with said expansion member, inserted into an aperture or recess in which the structure is to be secured, and the expansion member properly adjusted to its final position therein.

The member $a$ is thereupon rotated, either manually or by the application of any suitable tool, and, as said member advances axially, it encounters and operates to force forward the bearing plates $e$ $e$, causing them to assume a position nearly or quite perpendicular to the axis of said member $a$.

Manifestly the forcing forward of said bearing plates throws the bodies $d$ of the wings outward and away from each other, increasing the diametric proportions of the forward portion of the expansion member, and, said member being assumed to be duly proportioned to the recess or hole in which it is inserted for permanent engagement, said wings, in such expansion or throwing outward, are forced very strongly against the side faces of the recess, with the result that the structure, as an entirety, is very firmly secured therein.

It is obvious that the portion of the structure which constitutes the bearing plates, may, instead of existing in the form of two physically distinct plates, as in Figures 1 and 4, be formed as a single or mechanically continuous structure, as illustrated in Figure 2.

Whether formed as independent devices, or as physically continuous the one of the other, said plates, in the embodiment of Figures 1 and 4, form a curved or V-shaped structure adapted to be encountered by the advance end of the longitudinally movable member, and thereby flattened or lengthened, so to speak, to occasion the pressure of the wings or arms $d$ against the walls of a recess in which the structure may be located.

Whether the two bearing plates are integral or separate, they bear against each other, so to speak, under the pressure of the member $a$, with the result that their yielding motion under such pressure is one in which the wings or arms $d$ are thrown radially outward as explained.

The condition just referred to, of the abutment or contact of the inner ends of the bearing plates, is not, however, essential to the successful embodiment of my invention.

In Figure 3 I illustrate a form of expansion member in which the bearing plates $e$ are turned inwardly and rearwardly as shown, the free ends of the inturned portions existing in position to be encountered by the advance extremity of the bolt $a$ inserted through the head $c$, said inturned ends, however, being out of contact with each other.

In the embodiment of my invention just referred to, the contact of the advance end of the member $a$ with the ends of the inturned portions or plates $e$, will manifestly occasion the swinging outward of the members $d$ and their consequent binding engagement against the walls of a recess within which the structure may be located.

Of course, any selected means of supporting a single bearing plate or two bearing plates, so that pressure against it or them by the member $a$ will permit it or them to yield only in such direction as to bring about the radial expansion desired, may be resorted to at will.

My improved device, as will be understood, embodies as a whole in its preferred form, but two separable parts or members, to wit, the threaded member and the expansion member, and said members may remain engaged with each other in any handling to which they are subjected in transit from the manufacturer to their ultimate destination.

An important factor in the construction of my device, in what I consider its most economical as well as its most efficient forms, being the forms illustrated in the accompanying drawings, is the fact that the wings and the bearing plates are made of plate or sheet metal. The head also, may, as shown in Figure 2 be made of plate or sheet metal continuous of the wings.

The construction of the parts of plate or sheet metal, as just referred to, enables the structures to be produced at the minimum of cost with respect to the consumption both of metal and of time.

Furthermore, by reason of the plate or sheet metal construction of the wings and bearing plates, they yield quite readily to the pressure applied by the advance of the member $a$, and consequently practically all the pressure resulting from such advance of the member $a$ is utilized in forcing the members $d$ against the walls of a recess in which the structure is located, a very small part of such pressure being consumed in the physical bending of the metal, incident to the forcing of said wings outward.

Furthermore, the construction of said wings as plate or sheet metal members endows them with a certain amount of pliability by reason of which they are compacted, so to speak, under the pressure of the member $a$, very snugly against the walls of a recess, conforming to any unevenness thereof, and taking a tight hold upon said walls.

In referring to the members $d$ and $e$ as made, in the preferred construction, of plate or sheet metal, I do not employ those terms in a strict or technical sense as referring to metals produced by certain modes of manufacture alone,—but employ them in a general sense as signifying that the wings and plates are made of thin and preferably weblike form, regardless of whether the parts referred to are produced by bending up flat metal to the required form, or by casting operations.

The term "bearing plates" does not, of course, imply that the devices so referred to are necessarily in the form of plates strictly as such.

The point of application of the pressure, to wit, the point of contact between the advance end of the member $a$ and the bearing plates, is closely abreast of the point of maximum expansion of the wings or arms $d$, and contact between said wings and the walls of the recess, and hence the most direct use or application of the thrust of said member $a$ is obtained.

Having thus described my invention, I claim—

1. An expansion bolt structure adapted to be self-secured in a hole or recess, comprising a head, embodying an opening, a longitudinally movable member adapted to extend through said opening, a structure formed of plate or sheet metal, carried by said head, having portions adapted to present against the opposing walls of a hole or recess in which it may be entered, and a transversely extending portion adapted, in the travel of the longitudinally movable member, to be moved by said member and thereby occasion the radial thrust or expansion of a portion which presents against a wall of the hole or recess.

2. An expansion bolt member adapted to be inserted in and secured against withdrawal from a hole or recess, and comprising a head embodying an opening, a forwardly extending wing carried by said head, and a bearing plate carried on said wing and extending transversely into position to be encountered by a longitudinally movable member introduced through the opening in the head, said plate and wing being formed of plate or sheet metal, substantially as set forth.

3. An expansion bolt member comprising a head embodying an opening, a forwardly extending wing carried by said head, a bearing plate carried on said wing and extending inwardly and rearwardly into position to be encountered by a longitudinally movable member introduced through the opening in the head, substantially as set forth.

4. An expansion bolt device consisting of a head embodying an opening, a plurality of wings permanently affixed to said head and extending forward from it, and an approximately V-shaped structure carried on said wings, said structure being arranged transversely with respect to the axis of said opening and with its apex facing said opening so as to be encountered by a longitudinally movable member introduced through said opening, substantially as set forth.

5. An expansion bolt member consisting of a head having an opening, and a pair of wings, each provided with an inwardly and rearwardly extending bearing device adapted to be encountered by a member extending through said opening.

6. An expansion bolt member consisting of a head having a tapped opening, and a pair of wings each provided at its extremity with an inwardly and rearwardly extending bearing plate, said wings and plates being formed of sheet or plate metal.

7. In an expansion bolt member, in combination, a threaded bolt, an expansion member embodying a head having a tapped opening through which said bolt extends, a plurality of wings extending forward from said head, and bearing plates carried on the ends of said wings and extending toward the axis of the structure into position to be encountered by the end of the bolt, said wings and plate being formed of sheet or plate metal.

In testimony that I claim the foregoing as my invention I have hereunto signed my name this 14th day of February, A. D. 1902.

WILLIAM U. GRIFFITHS.

In presence of—
S. SALOME BROOKE,
THOS. K. LANCASTER.